3,342,830
METHOD FOR PRODUCING 2,2′-BIPYRIDYLIUM SALTS

Charles Shepherd, Bracknell, England, assignor to Imperial Chemical Industries Limited, London, England, a corporation of Great Britain
No Drawing. Filed Jan. 22, 1965, Ser. No. 427,457
Claims priority, application Great Britain, June 8, 1964, 23,598/64
6 Claims. (Cl. 260—296)

ABSTRACT OF THE DISCLOSURE

A process for the preparation of herbicidal bridged diquaternary salts of 2,2′ - bipyridyl is disclosed in which 2,2′ - bipyridyl is brought into reaction with a haloalkanol wherein the halogen atom is attached to the carbon atom adjacent to that bearing the hydroxyl group.

---

This invention relates to the manufacture of herbicidal materials, and more particularly to the manufacture of alkylene 2:2′-bispyridylium salts.

The manufacture of herbicidal bis-quaternary salts by interaction of ethylene dibromide with 2:2′-bipyridyl is known. Ethylene dichloride is less reactive, and usually requires an elevated pressure and temperature to make it react with 2:2′-bipyridyl at a speed adequate for commercial purposes, and under these conditions the reaction mixture is inconveniently corrosive. Consequently, although the expense of the bromide content of the bispyridylium salt (which does not itself contribute to the herbicidal effect of the product) can be avoided by use of the chloride, the manufacture of the chloride has not been found hitherto to be an attractive commercial proposition.

We have now found that 2:2′-bipyridylium salts including 2:2′-ethylene bispyridylium chloride can be obtained readily at atmospheric pressures by bringing 2:2′ bipyridyl into reaction with certain mono-haloalkanols.

Accordingly this invention comprises a process for making an alkylene 2:2′ bispyridylium halide comprising bringing into reaction 2:2′-bipyridyl and a straight-chain mono-haloalkanol wherein an atom of halogen and a hydroxyl group are attached to adjacent carbon atoms in the carbon chain of the alkanol molecule and either the atom of the halogen or the hydroxyl group is attached to a terminal carbon atom of the carbon chain.

Haloalkanols which are suitable are mono-bromo and mono-chloro alkanols containing from 2 to 5 carbon atoms in the unbranched carbon chain of the alkanol molecule. Examples of suitable haloalkanols include 2-chloro- 1 - pentanol, 1 - chloro - 2 - pentanol, 2 - chloro-1 - butanol, 1 - chloro - 2 - butanol, 2 - chloro - 1 - propanol, 1 - chloro - 2 - propanol and 1 - chloro - 2 - ethanol. The use of 1 - chloro - 2 - ethanol is of especial importance not only because of the ease with which it can be made to react with the 2:2′-bipyridyl, but also because of the pronounced herbicidal properties of the resulting ethylene 2:2′-bispyridylium chloride. The reaction between the haloalkanol and the bipyridyl takes place more readily in the absence of any substantial quantity of free acid and since haloalkanols on storage tend to develop acidity they may require purification before use.

The process may be carried out simply by heating the haloalkanol and the 2:2′-bipyridyl together. The reaction can be made to take place at different temperatures, although those in the range of 130–170° C. are preferred. Higher temperatures may be also used, although no particular advantage may be gained thereby. Lower temperatures may result in the reaction taking place at a rate which is too low to be convenient. The reaction can be carried out using the reactants dissolved in a solvent, which may be selected so as to boil at a temperature which is high enough to enable the reaction to take place quickly. Suitable solvents include water, polar organic solvents for example alcohols, ethers and nitrohydrocarbons, and non-polar organic solvents for example hydrocarbons and chlorinated hydrocarbons. Solvents which have given especially good results include nitrobenzene and ethylene dichloride. It is also possible to use the haloalkanol itself as the solvent in which case the quantity used is preferably in excess of that required for reaction with the bipyridyl. The choice of solvent is dependent in some measure upon whether the product is required to be precipitated as it is formed or it is to be maintained in solution. For some purposes the former is required in which case the use of nitrobenzene is very suitable.

The proportions in which the bipyridyl and the haloalkanol may be used can vary widely depending upon whether the haloalkanol is to be used as a solvent. In general the ratio of the amounts used will vary from 1:2–1:10, although very good results have been obtained by using one part of bipyridyl to five of the haloalkanol. Although there is no necessity for the reaction to be carried out at elevated pressures especially high yields of product are nevertheless obtainable at such pressures.

This invention is illustrated by the following examples.

Example 1

5 gm. of 2:2′-bipyridyl and 25 gm. of 1 - chloro - 2-ethanol were heated together at a reflux temperature of 130° C. for 14 hours. The resulting solution was treated with five times its volume of acetone and the crystalline precipitate collected on a filter and washed with acetone. 5 gm. of ethylene 2:2′-bispyridylium chloride representing a 61% conversion of the original 2:2′-bipyridyl were obtained.

Example 2

7.8 gm. of 2:2′-bipyridyl and 25 gm. of 1 - chloro - 2-ethanol were heated at 175° C. for 14 hours in a sealed tube. The tube and its contents were then allowed to cool and the resulting mass of crystals, together with a certain amount of super-natant liquid was treated with three times its volume of acetone. The crystals were then filtered off, washed with acetone and dried at 70° C. 11 gm. of ethylene 2:2′-bispyridylium chloride were obtained representing an 86% conversion of the original 2:2′-bipyridyl.

Example 3

6.24 gm. of 2:2′-bipyridyl were mixed with 11 gm. of 1 - chloro - 2 - propanol and 25 ml. of nitrobenzene. The mixture was then refluxed at a temperature corresponding approximately to the boiling point of the nitrobenzene (130° C.) for 8 hours. The mixture was then cooled and 4 ml. of acetone were added to the resulting slurry of crystals. The latter were then filtered off, washed with more acetone and then dissolved in 20 ml. of methanol. The solution was then treated with solid sodium carbonate. The mixture was then filtered to remove excess of the carbonate after which the filtrate was evaporated. The resulting product comprised 6 gm. of 1″,2″-propylene 22′1:bispyridylium dichloride in the form of crystals which decomposed without melting at about 300° C.

What I claim is:
1. A process of making a 2:2′-bispyridylium halide comprising bringing into reaction 2:2′-bipyridyl and a lower mono-haloalkanol wherein an atom of halogen and a hydroxy group are attached to adjacent carbon atoms in the carbon chain of the alkanol molecule and either the atom of the halogen or the hydroxyl group is attached to a terminal carbon atom of the carbon chain.

2. A process according to claim 1 wherein the haloalkanol contains from 2 to 5 carbon atoms.

3. A process according to claim 2 wherein the haloalkanol is a chloro-alkanol.

4. A process according to claim 3 wherein the chloroalkanol is 1-chloro-2-ethanol.

5. A process according to claim 1 comprising heating the 2:2′-bipyridyl and the haloalkanol to a temperature within the range of 130–170° C.

6. A process according to claim 5 wherein the reaction between the 2:2′-bipyridyl and the haloalkanol is carried out in the presence of a solvent.

References Cited
FOREIGN PATENTS
813,532  3/1959  Great Britain.

WALTER A. MODANCE, *Primary Examiner.*

A. L. ROTMAN, *Assistant Examiner.*